United States Patent
Hirano et al.

(10) Patent No.: US 6,791,532 B2
(45) Date of Patent: Sep. 14, 2004

(54) INPUT DEVICE AND DETECTION DEVICE USING RESISTANCE TYPE STRAIN SENSOR ELEMENT

(75) Inventors: Shinji Hirano, Fukushima-ken (JP); Masaru Komatsu, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 279 days.

(21) Appl. No.: 10/170,262

(22) Filed: Jun. 12, 2002

(65) Prior Publication Data

US 2002/0190949 A1 Dec. 19, 2002

(30) Foreign Application Priority Data

Jun. 18, 2001 (JP) ........................................ 2001-183502

(51) Int. Cl.[7] ............................ G09G 5/08; G06F 17/00
(52) U.S. Cl. ........................ 345/161; 345/156; 345/160; 463/38
(58) Field of Search ................................ 345/156, 157, 345/160, 161; 463/38

(56) References Cited

U.S. PATENT DOCUMENTS

| | | | | |
|---|---|---|---|---|
| 5,117,687 A | * | 6/1992 | Gerardi | .................. 73/170.15 |
| 5,872,320 A | * | 2/1999 | Kamentser et al. | .... 73/862.044 |
| 5,912,612 A | * | 6/1999 | DeVolpi | ...................... 338/95 |
| 6,121,954 A | | 9/2000 | Seffernick | |
| 6,195,082 B1 | * | 2/2001 | May et al. | ................... 345/161 |
| 6,221,023 B1 | * | 4/2001 | Matsuba et al. | ............ 600/486 |
| 6,243,077 B1 | * | 6/2001 | Manara et al. | .............. 345/157 |
| 6,359,613 B1 | * | 3/2002 | Poole | .......................... 345/161 |

* cited by examiner

Primary Examiner—Regina Liang
Assistant Examiner—Duc Q Dinh
(74) Attorney, Agent, or Firm—Brinks Hofer Gilson & Lione (57) ABSTRACT

To provide an input device including a deformable electrical insulating sensor base, an operation end connected to the center portion of the sensor base, a first resistive layer provided on one surface of the sensor base, a second resistive layer provided on a surface opposite to the one surface of the sensor base, and a detecting circuit in which a force is exerted on the operation end in a horizontal direction or a vertical direction to deform the sensor base, and changes of resistance values of the first resistive layer and the second resistive layer by the deformation of the sensor base are electrically detected, wherein the force exerted on the operation end in the horizontal direction is detected by the first resistive layer, and the force exerted on the operation end in the vertical direction is detected by the first resistive layer and the second resistive layer.

5 Claims, 8 Drawing Sheets

INPUT DEVICE AND DETECTION DEVICE USING RESISTANCE TYPE STRAIN SENSOR ELEMENT

BACKGROUND OF THE INVENTION

1. Field of the Invention

The present invention relates to an input device used for, for example, a personal computer or a remote control, and a detection device used for, for example, an accelerometer, and particularly to an input device and a detection device (hereinafter typified by an input device) using a resistance type strain sensor element.

2. Description of the Related Art

Various input devices using resistance type strain sensor elements for operation parts or the like are proposed in various industrial fields such as the electrical industry, automotive industry, machine industry, or civil engineering industry.

Figure 11:
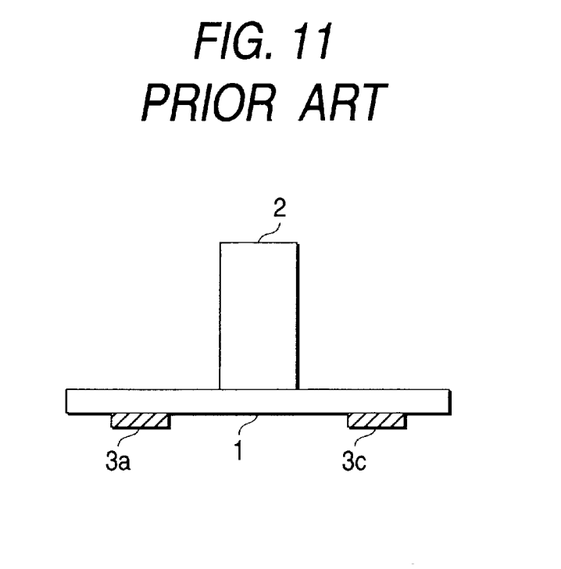
FIG. 11 is a front view of a conventional input device.
Figure 12:
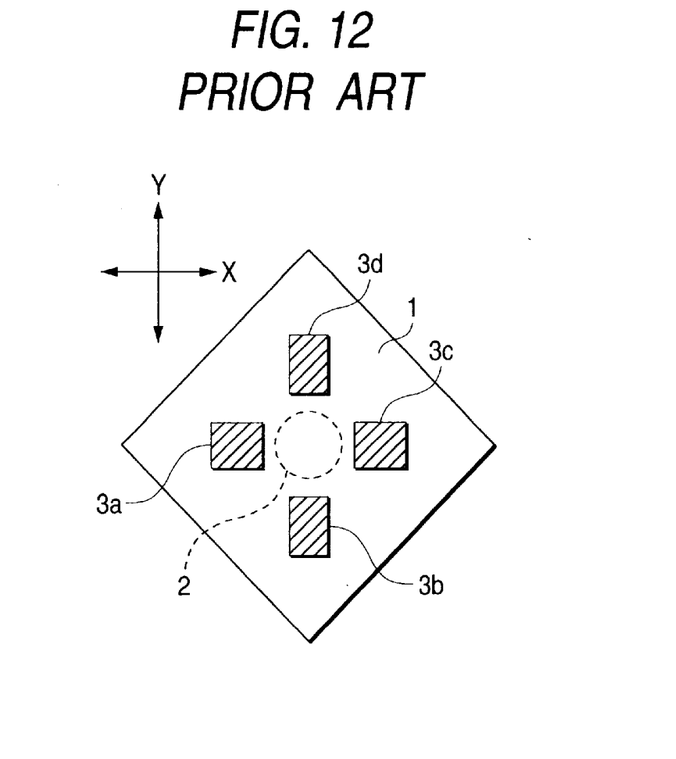
FIG. 12 is a bottom view of the input device shown in FIG. 11.
Figure 13:
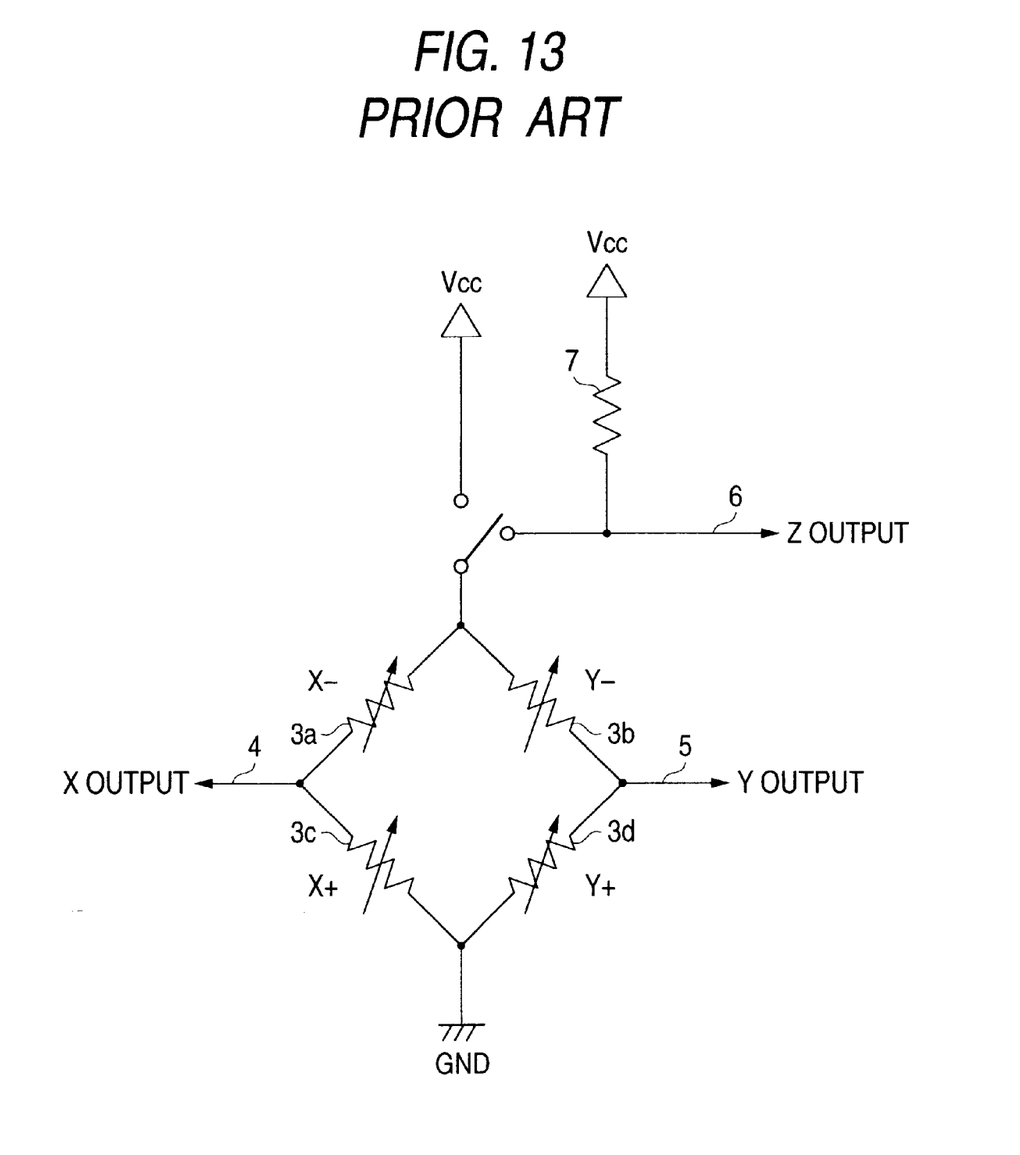
FIG. 13 is a detecting circuit diagram of the input device shown in FIG. 11.
Figure 14:
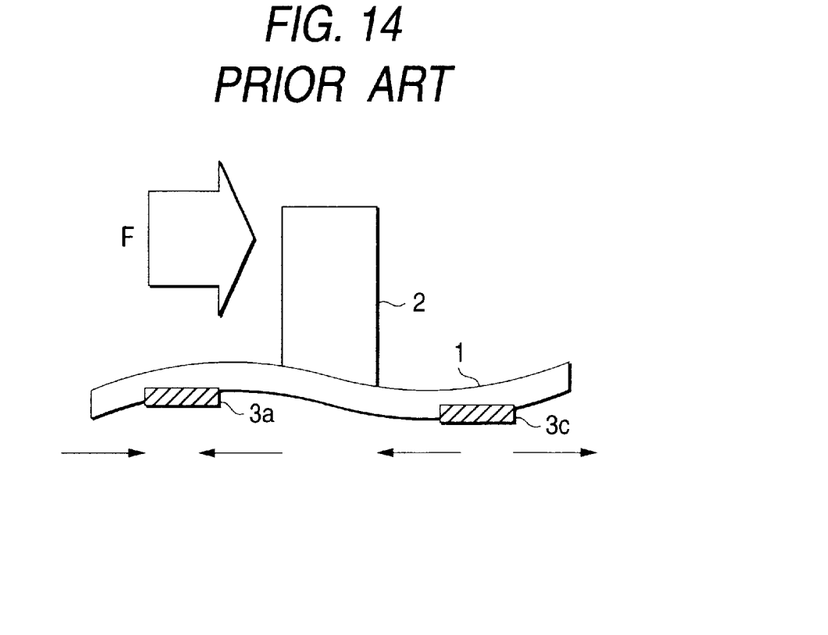
FIG. 14 is an operation explanatory view of the input device shown in FIG. 11.
Figure 15:
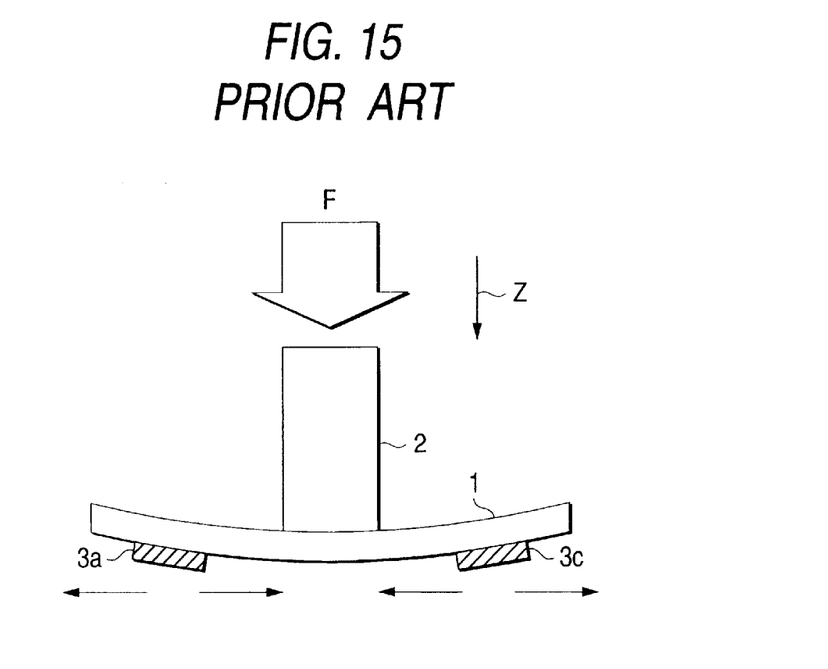
FIG. 15 is an operation explanatory view of the input device shown in FIG. 11.

FIG. 11 is a front view of a conventional input device of this type; FIG. 12 is a bottom view of the input device; FIG. 13 is a detecting circuit diagram of the input device; and FIGS. 14 and 15 are operation explanatory views of the input device.

As shown in FIGS. 11 and 12, the input device of this type is mainly constituted by a thin plate sensor base 1 made of alumina or the like and having slight flexibility, an operation end 2 erectly provided at the center portion of the upper surface of the sensor base 1, and four resistive layers 3a to 3d formed on the lower surface of the sensor base 1 by thick-film printing. As shown in FIG. 12, the four resistive layers 3a to 3d are provided at even intervals horizontally and vertically with a connected portion to the operation end 2 as the center, the resistive layer 3a faces the resistive layer 3c, and the resistive layer 3b faces the resistive layer 3d. These resistive layers 3a to 3d constitute a bridge circuit as shown in FIG. 13. Reference numeral 4 in FIG. 13 designates an X-direction output end; 5, a Y-direction output end; 6, a Z-direction output end; and 7, an external fixed resistor for Z-direction detection.

The relation between a resistance value variation of the resistive layer 3 and a strain amount is generally expressed by the following expression, and the resistance value variation is in proportion to the strain amount:

$$\Delta R/R = \epsilon \cdot (1+2\nu) \Delta \rho/\rho$$

wherein $\Delta R/R$ is a variation of resistance value; $\epsilon$ is a strain amount; $\nu$ is a Poisson's ratio; and $\Delta \rho/\rho$ is a variation of specific resistance.

For example, as shown in FIG. 14, in the case where (X-direction) external force F is exerted on the operation end 2 from the left to the right, the sensor base 1 is bent and is deformed as shown in FIG. 14 (for facilitating an understanding, an extremely deformed state beyond an actual state is shown). The resistive layer 3a in the acting direction of the external force F is compressed by this deformation, and its resistance value is lowered, whereas the resistive layer 3c is pulled, and its resistance value is increased. In the case where the external force F is exerted in the direction opposite to the direction shown in FIG. 14, the resistance value of the resistive layer 3a is increased, and the resistance value of the resistive layer 3c is lowered. Incidentally, since the other resistive layers 3b and 3d do not exist in the acting direction of the external force F, their resistance values are not changed.

Although not shown, in the case where the external force F is applied in the Y direction, the resistance values of the resistive layer 3b and the resistive layer 3d are changed, whereas the resistance values of the resistive layer 3a and the resistive layer 3c are not changed. As shown in FIG. 15, in the case where the external force F in the vertical direction (Z direction) is exerted on the operation end 2, the sensor base 1 is bent as shown in FIG. 15, and all the four resistive layers 3a to 3d are pulled by this deformation so that the resistance values are increased.

The changes of the resistance values of the resistive layers 3a to 3d are electrically detected by the detecting circuit of FIG. 13, and a detection signal is obtained from a predetermined output end. Incidentally, with respect to the detection in the vertical direction (Z direction), the total change of the resistance values of the resistive layers 3a to 3d is compared with the external fixed resistor (reference value) 7 for Z direction detection, and a detection signal is obtained.

In the conventional input device, since the detection in the vertical direction is carried out through the comparison between the resistive layer 3 of the variable resistance and the fixed resistance 7, the output in the vertical direction cannot be sufficiently obtained. Besides, the adjustment of detection sensibility in the vertical direction (Z direction) cannot be carried out separately from the adjustment of detection sensibility in the horizontal direction (X and Y directions), and the adjustment of the sensibility in the vertical direction cannot be substantially carried out.

Further, although the detection in the vertical direction is carried out by the resistive layer 3 and the external fixed resistor 7, since the temperature characteristics are different from each other because of a difference in the constitution of both, in order to secure excellent temperature characteristics as a detection device, materials excellent in temperature characteristics must be used for both, and there is a problem that the cost becomes high.

SUMMARY OF THE INVENTION

An object of the invention is to solve the defects of the related art and to provide an input device and a detection device in which the output in the vertical direction can be sufficiently obtained, the adjustment of sensibility in the vertical direction can be independently carried out, and the cost can be reduced.

In order to achieve the above object, according to a first aspect of the invention, an input device includes an electrical insulating sensor base which is, for example, a thin plate and is deformable, an operation end connected to a center portion of the sensor base, a first resistive layer (for example, a lower-surface resistive layer) provided on one surface (for example, a lower surface) of the sensor base, a second resistive layer (for example, an upper-surface resistive layer) provided on a surface (for example, an upper surface) opposite to the one surface of the sensor base, and a detecting circuit (for example, a bridge circuit) in which a force is exerted on the operation end in a horizontal direction or a vertical direction to deform the sensor base, and changes of resistance values of the first resistive layer and the second resistive layer by the deformation of the sensor base are electrically detected, wherein the force exerted on the operation end in the horizontal direction is detected by the first resistive layer, and the force exerted on the operation end in the vertical direction is detected by the first resistive layer and the second resistive layer.

According to a second aspect of the invention, in the first aspect, the first resistive layer includes four or more (for example, four) resistive layers provided at even intervals in a circumferential direction of a connected portion, as a center, between the sensor base and the operation end, and the second resistive layer includes one or more (for example, four) resistive layers.

According to a third aspect of the invention, the input device of the first aspect or the second aspect is provided on a keyboard.

According to a fourth aspect of the invention, a detection device includes an electrical insulating sensor base which is, for example, a thin plate and is deformable, a detection end connected to a center portion of the sensor base, a first resistive layer (for example, a lower-surface resistive layer) provided on one surface (for example, a lower surface) of the sensor base, a second resistive layer (for example, an upper-surface resistive layer) provided on a surface (for example, an upper surface) opposite to the one surface of the sensor base, and a detecting circuit (for example, a bridge circuit) in which a force is exerted on the detection end in a horizontal direction or a vertical direction to deform the sensor base, and changes of resistance values of the first resistive layer and the second resistive layer by the deformation of the sensor base are electrically detected, wherein the force exerted on the detection end in the horizontal direction is detected by the first resistive layer, and the force exerted on the detection end in the vertical direction is detected by the first resistive layer and the second resistive layer.

According to a fifth aspect of the invention, in the fourth aspect, the first resistive layer includes four or more (for example, four) resistive layers provided at even intervals in a circumferential direction of a connected portion, as a center, between the sensor base and the detection end, and the second resistive layer includes one or more (for example, four) resistive layers.

In the first aspect and the fourth aspect of the invention, since the first resistive layer and the second resistive layer are provided on the lower surface and the upper surface of the sensor base, that is, the surfaces opposite to each other, when the detection in the vertical direction (Z direction) is carried out, one resistive layer is pulled, and its resistance value is increased the other resistive layer is compressed, and its resistance value is lowered. As stated above, the two resistive layers are variable resistors, and the changes of the resistance values have tendencies opposite to each other, so that a large detection output can be obtained.

Besides, the sensibility adjustment in the vertical direction can be independently carried out through the second resistive layer. Further, since the first resistive layer and the second resistive layer can be formed on the same sensor base by using the same material and by, for example, thick-film printing, the temperature characteristics of the first resistive layer and the second resistive layer can be made identical to each other, and the cost can be reduced.

DESCRIPTION OF THE PREFERRED EMBODIMENTS

Figure 1:
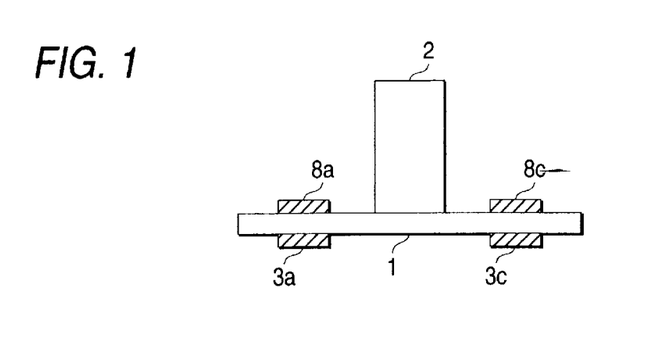
FIG. 1 is a front view of an input device of a first embodiment of the invention.
Figure 2:
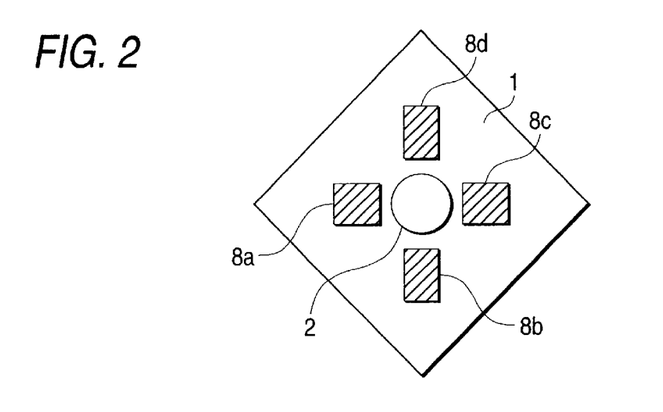
FIG. 2 is a plan view of the input device shown in FIG. 1.
Figure 3:
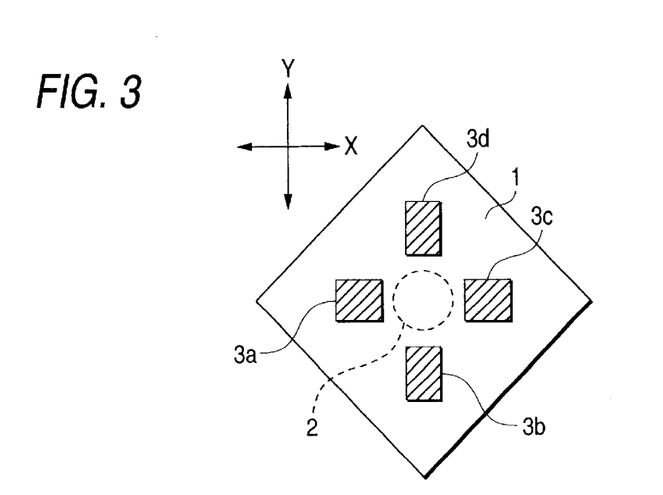
FIG. 3 is a bottom view of the input device shown in FIG. 1.
Figure 4:
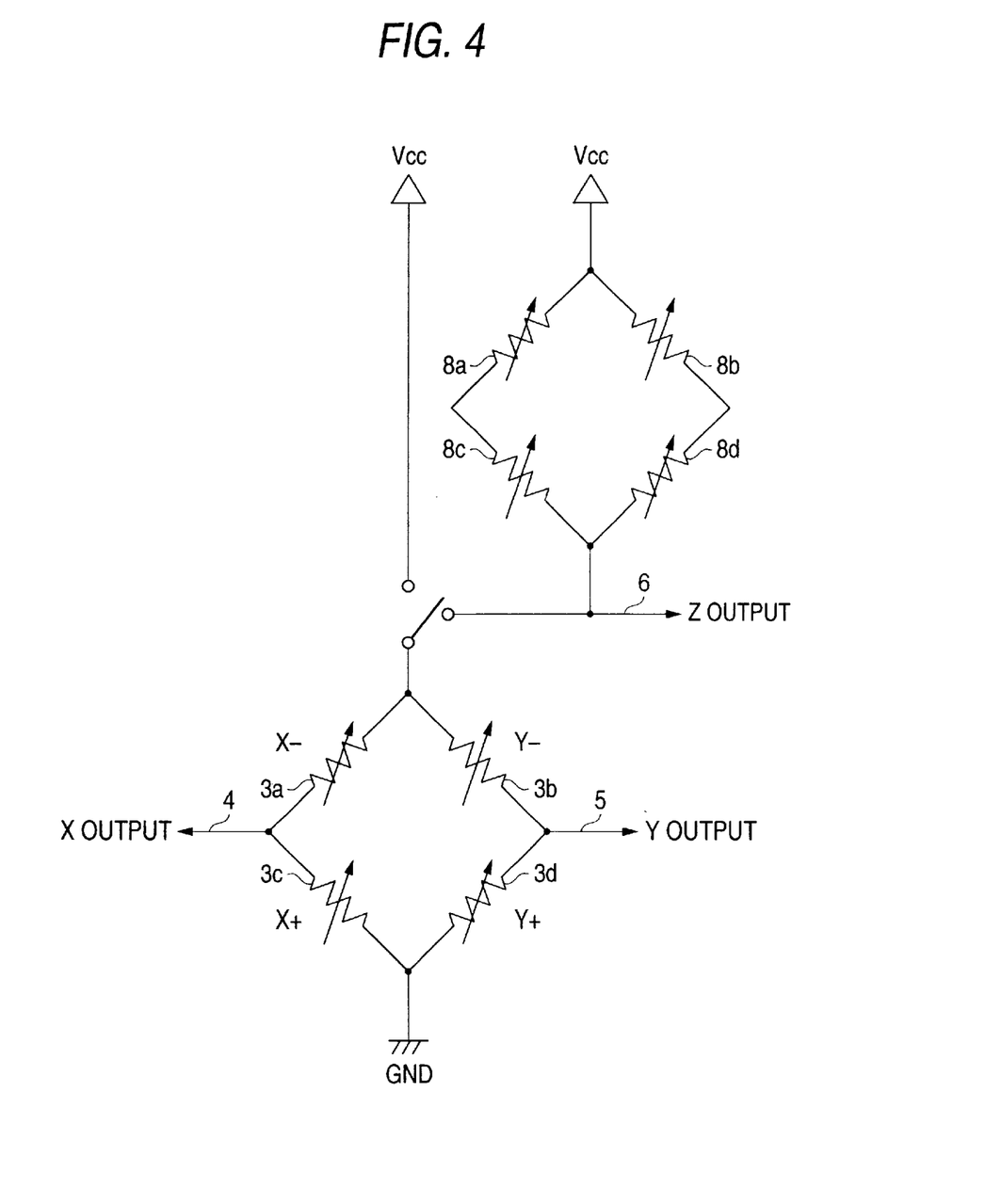
FIG. 4 is a detecting circuit diagram of the input device shown in FIG. 1.
Figure 5:
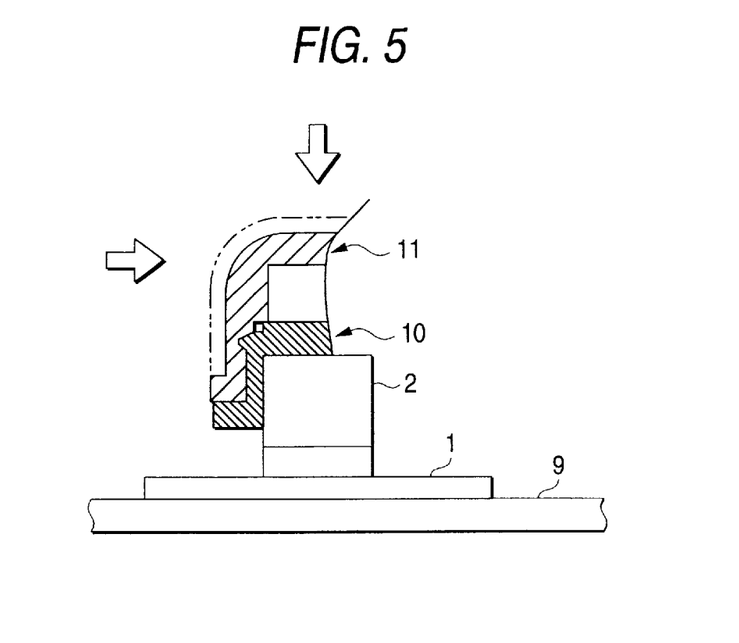
FIG. 5 is a sectional view showing a fitting state of the input device shown in FIG. 1.
Figure 6:
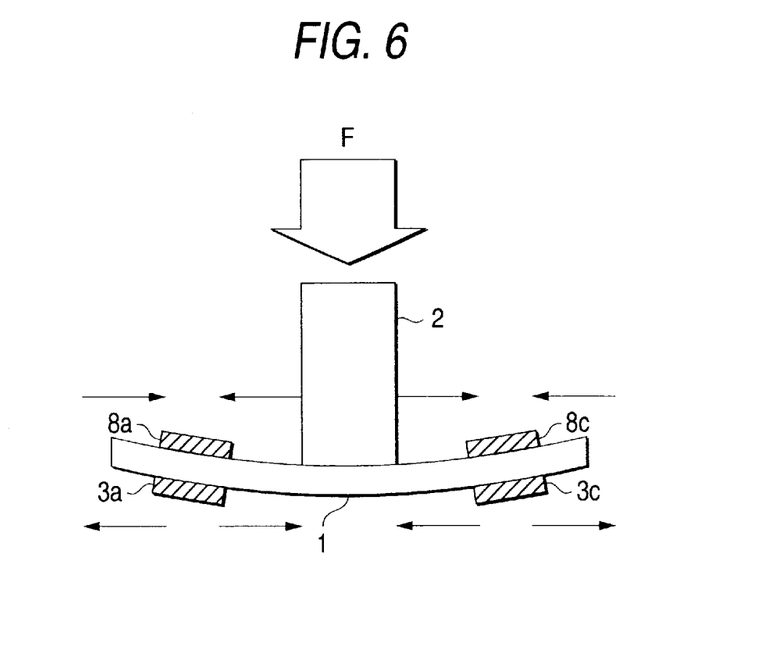
FIG. 6 is an operation explanatory view of the input device shown in FIG. 1.

Hereinafter, embodiments of the invention will be described with reference to the drawings. FIGS. 1 to 6 are views for explaining an input device of a first embodiment, in which FIG. 1 is a front view of the input device; FIG. 2 is a plan view of the input device; FIG. 3 is a bottom view of the input device; FIG. 4 is a detecting circuit diagram of the input device; FIG. 5 is a sectional view showing a fitting state of the input device; and FIG. 6 is an operation explanatory view of the input device.

As shown in FIGS. 1 to 3, the input device is mainly constituted by a sensor base 1 which is made of alumina or the like, is a thin plate, has a large Young's modulus, and has slight flexibility; an operation end 2 which is made of alumina or a metal, and is erectly provided on the center portion of an upper surface of the sensor base 1 in integral molding; four lower-surface side resistive layers 3a to 3d formed on a lower surface of the sensor base 1 by thick-film printing, and four upper-surface side resistive layers 8a to 8d formed on the upper surface of the sensor base 1 by thick-film printing. In this embodiment, although the lower-surface side resistive layers 3a to 3d and the upper-surface side resistive layers 8a to 8d are provided at symmetrical positions of the upper and lower surfaces, it is not always necessary to provide them at the upper and lower symmetrical positions.

As shown in FIG. 3, the lower-surface side resistive layers 3a to 3d are provided vertically and horizontally at even intervals around a connected portion against the operation end 2, and the resistive layer 3a and the resistive layer 3c, and the resistive layer 3b and the resistive layer 3d are respectively opposite to each other. Besides, as shown in FIG. 2, the upper-surface side resistive layers 8a to 8d are provided vertically and horizontally at even intervals around the connected portion against the operation end 2, and the resistive layer 8a and the resistive layer 8c, and the resistive layer 8b and the resistive layer 8d are respectively opposite to each other. These lower-surface side resistive layers 3a to 3d, and the upper-surface side resistive layers 8a to 8d constitute bridge circuits as shown in FIG. 4. Reference numeral 4 in FIG. 4 designates an X-direction output end; 5, a Y-direction output end; and 6, a Z-direction output end.

The detection in the horizontal direction (X and Y directions) is carried out by the lower-surface side resistive layers 3a to 3d, and since the detection operation is similar to the conventional input device shown in FIG. 14, a duplicate explanation is omitted.

As shown in FIG. 6, in the case where an external force F in the vertical direction (Z direction) is exerted on the operation end 2, the sensor base 1 is warped as shown in FIG. 6, and by this deformation, all the four lower-surface side resistive layers 3a to 3d provided on the lower surface of the sensor base 1 are pulled, and their resistance values are increased, whereas the four upper-surface side resistive layers 8a to 8d provided on the upper surface of the sensor base 1 are compressed, and their resistance values are lowered. As stated above, the resistance values of the lower-surface side resistive layers 3 are increased, and the resistance values of the upper-surface side resistive layers 8 are lowered to the contrary, so that the resistance difference between the lower-surface side resistive layer 3 and the upper-surface side resistive layer 8 is in the increasing direction, and the output in the vertical direction (Z direction) becomes larger (about twice) than a conventional one.

As shown in FIG. 5, the input device of this embodiment is mounted on a printed circuit board 9 for a keyboard of a personal computer, and a flocked cap 11 is fitted to the upper portion of the operation end 2 through a plastic adapter 10. Although the input device is mounted on the printed circuit board 9, the sensor base 1 can be freely deformed by moving the operation end 2 in the X, Y and Z directions. An action, for example, movement of a cursor on a display screen of a personal computer, selection of a menu, or scrolling, is carried out by the operation of the cap 11 (operation end 2).

Figure 7:
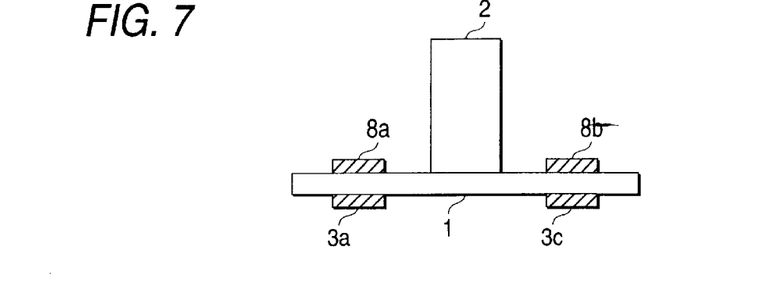
FIG. 7 is a front view of an input device of a second embodiment of the invention.
Figure 8:
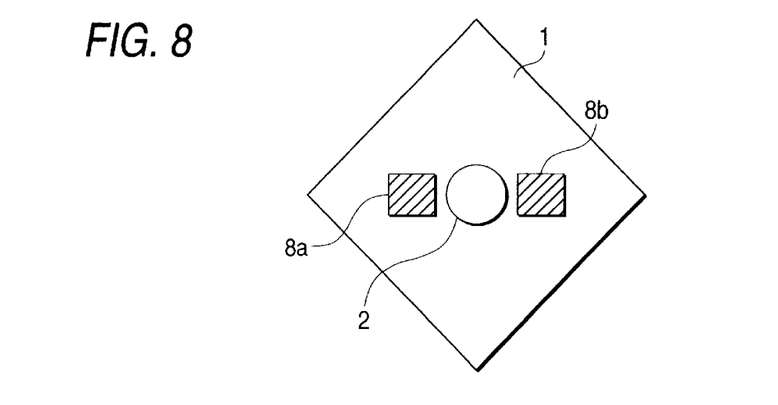
FIG. 8 is a plan view of the input device shown in FIG. 7.
Figure 9:
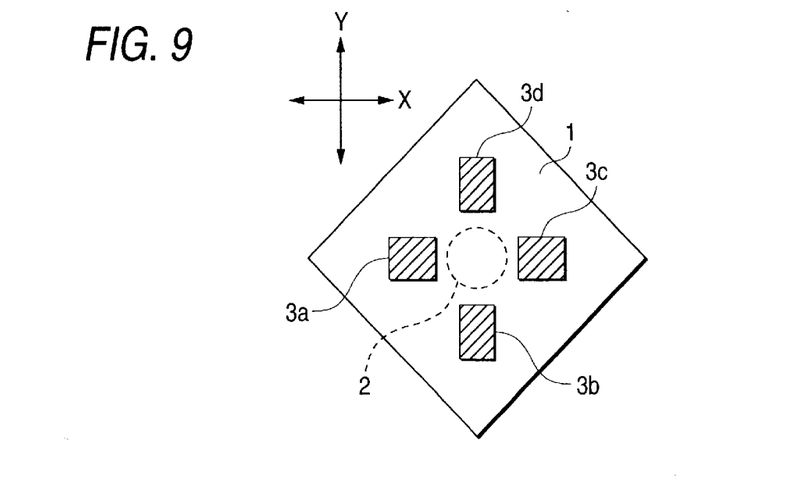
FIG. 9 is a bottom view of the input device shown in FIG. 7.
Figure 10:
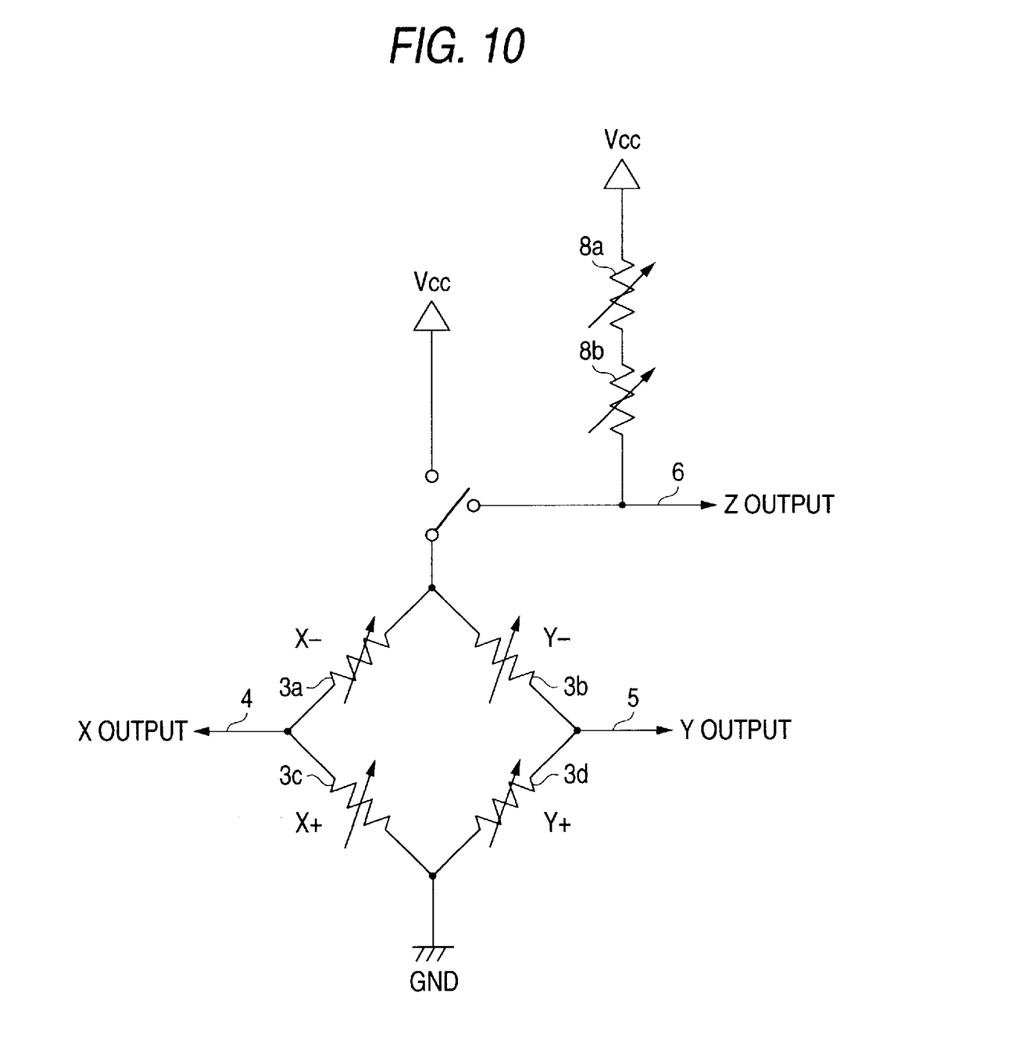
FIG. 10 is a detecting circuit diagram of the input device shown in FIG. 7.

FIGS. 7 to 10 are views for explaining an input device of a second embodiment, in which FIG. 7 is a front view of the input device; FIG. 8 is a plan view of the input device; FIG. 9 is a bottom view of the input device; and FIG. 10 is a detecting circuit diagram of the input device.

In this embodiment, the point different from the first embodiment is that as shown in FIG. 8, two upper-surface side resistive layers 8a and 8b are provided at both sides of (or before and behind) an operation end 2 as the center.

Although not shown, in the case where an external force F in the vertical direction (Z direction) is exerted on the operation end 2, a sensor base 1 is warped downward, and all four lower-surface side resistive layers 3a to 3d provided on the lower surface of the sensor base 1 are pulled by this deformation, and their resistance values are increased, whereas the two upper-surface side resistive layers 8a and 8b provided on the upper surface of the sensor base 1 are compressed, and their resistance values are lowered. As stated above, the resistance value of the lower-surface side resistive layer 3 is increased, and the resistance value of the upper-surface side resistive layer 8 is lowered, so that the resistance difference between both the resistive layers 3 and 8 is in the increasing direction, and the output in the vertical direction (Z direction) becomes larger than a conventional one.

The resistive layers 3 and 8 are composed of, for example, a metal oxide such as ruthenium oxide, acetylene black, graphite, a mixture of silver powder and graphite, or a mixture of nickel powder and graphite, and a binder such as phenol resin.

In the above embodiment, although the four lower-surface side resistive layers 3 are provided, the invention is not limited to this. For example, when six or eight, larger than four, lower-surface side resistive layers 3 are provided around the operation end 2 in the circumferential direction at even intervals, the detection in the X and Y directions (horizontal direction) can be carried out. Besides, in the foregoing embodiments, although the four upper-surface side resistive layers 8 (first embodiment) or the two upper-surface side resistive layers (second embodiment) are provided, the invention is not limited to these, and it is sufficient if at least one upper-surface side resistive layer is provided. In the case of one upper-surface side resistive layer, for example, it may be provided annularly with the operation end 2 as the center.

In the embodiments, the detection in the horizontal direction is carried out by the lower-surface side resistive layers, and the detection in the vertical direction is carried out by the lower-surface side resistive layers and the upper-surface side resistive layers, however, the invention is not limited to this. The detection in the horizontal direction can be carried out by the upper-surface side resistive layers, and the detection in the vertical direction can be carried out by the upper-surface side resistive layers and the lower-surface side resistive layers.

In the embodiments, the description has been given of the case of the input device, however, the invention is not limited to this, but can also be applied to a detection device in which the operation end of the input device is replaced by a detection body, the detection body is moved by an operating force (mechanical force, magnetic force, wind force, vibration, etc.) from an object to be detected, the sensor base is deformed, and the operating force is detected by the resistance type strain sensor element as described above.

As described above, according to the invention, an input device includes a deformable electrical insulating sensor base, an operation end connected to the center portion of the sensor base, a first resistive layer provided on one surface of the sensor base, a second resistive layer provided on a surface opposite to the one surface of the sensor base, and a detecting circuit in which a force is exerted on the operation end in the horizontal direction or the vertical direction to deform the sensor base, and changes of resistance values of the first resistive layer and the second resistive layer by the deformation of the sensor base are electrically detected, wherein the force exerted on the operation end in the horizontal direction is detected by the first resistive layer, and the force exerted on the operation end in the vertical direction is detected by the first resistive layer and the second resistive layer.

Besides, as described above, according to the invention, a detection device includes a deformable electrical insulating sensor base, a detection end connected to the center portion of the sensor base, a first resistive layer provided on one surface of the sensor base, a second resistive layer provided on a surface opposite to the one surface of the sensor base, and a detecting circuit in which a force is exerted on the detection end in the horizontal direction or the vertical direction to deform the sensor base, and changes of resistance values of the first resistive layer and the second resistive layer by the deformation of the sensor base are electrically detected, wherein the force exerted on the detection end in the horizontal direction is detected by the first resistive layer, and the force exerted on the detection end in the vertical direction is detected by the first resistive layer and the second resistive layer.

As stated above, according to the invention, since the first resistive layer and the second resistive layer are provided on the lower surface and the upper surface of the sensor base, that is, the surfaces opposite to each other, when the detection in the vertical direction (Z direction) is carried out, one resistive layer is pulled, and its resistance value is increased, whereas the other resistive layer is compressed, and its resistance value is lowered. As stated above, the two resistive layers are variable resistors, and the changes of the resistance values have tendencies opposite to each other, so that a large detection output can be obtained.

Besides, the sensibility adjustment in the vertical direction can be independently carried out through the second resistive layer. Further, since the first resistive layer and the second resistive layer can be formed on the same sensor base by using the same material and by, for example, thick-film printing, there are effects that the temperature characteristics of the first resistive layer and the second resistive layer can be made identical to each other, and the cost can be reduced.

What is claimed is:

1. An input device comprising:

a deformable electrical insulating sensor base;

an operation end connected to a center portion of the sensor base;

a first resistive layer provided on one surface of the sensor base;

a second resistive layer provided on a surface opposite to the one surface of the sensor base; and a detecting circuit in which a force is exerted on the operation end in one of a horizontal direction and a vertical direction to deform the sensor base, and changes of resistance value of the first resistive layer and the second resistive layer by the deformation of the sensor base are electrically detected, wherein the force exerted on the operation end in the horizontal direction is detected by the first resistive layer, and the force exerted on the operation end in the vertical direction is detected by the first resistive layer and the second resistive layer.

2. An input device according to claim 1, wherein the first resistive layer includes at least four resistive layers provided at even intervals in a circumferential direction of a connected portion, as a center, between the sensor base and the operation end, and the second resistive layer includes at least one resistive layer.

3. An input device according to claim 1, wherein the input device is provided on a keyboard.

4. A detection device comprising:

a deformable electrical insulating sensor base;

a detection end connected to a center portion of the sensor base;

a first resistive layer provided on one surface of the sensor base;

a second resistive layer provided on a surface opposite to the one surface of the sensor base; and a detecting circuit in which a force is exerted on the detection end in one of a horizontal direction and a vertical direction to deform the sensor base, and changes of resistance values of the first resistive layer and the second resistive layer by the deformation of the sensor base are electrically detected, wherein the force exerted on the detection end in the horizontal direction is detected by the first resistive layer, and the force exerted on the detection end in the vertical direction is detected by the first resistive layer and the second resistive layer.

5. A detection device according to claim 4, wherein the first resistive layer includes at least four resistive layers provided at even intervals in a circumferential direction of connected portion, as a center, between the sensor base and the detection end, and the second resistive layer includes at least one resistive layer.

* * * * *

UNITED STATES PATENT AND TRADEMARK OFFICE
CERTIFICATE OF CORRECTION

PATENT NO. : 6,791,532 B2
DATED : September 14, 2004
INVENTOR(S) : Shinji Hirano et al.

It is certified that error appears in the above-identified patent and that said Letters Patent is hereby corrected as shown below:

Column 7,
Line 28, after "resistance" delete "value" and substitute -- values -- in its place.

Signed and Sealed this

Twenty-ninth Day of November, 2005

JON W. DUDAS
*Director of the United States Patent and Trademark Office*